United States Patent

[11] 3,626,483

[72] Inventors Albert Whetstone
Southport, Conn.;
Samuel Fine, New City, N.Y.; William
Banks, Fairfield; Stanely Phillips,
Trumbull, both of Conn.

[21] Appl. No. 842,148

[22] Filed July 16, 1969

[45] Patented Dec. 7, 1971

[73] Assignee Science Accessories Corporation
Southport, Conn.

[54] SPARK PEN
10 Claims, 2 Drawing Figs.

[52] U.S. Cl. .......... 181/0.5, 178/18, 178/87

[51] Int. Cl. .......... G01v 1/02

[50] Field of Search .......... 178/18–20, 87; 317/96, 97

[56] References Cited

UNITED STATES PATENTS

| | | | |
|---|---|---|---|
| 407,581 | 7/1889 | Dewey | 178/87 |
| 3,156,766 | 11/1964 | Stamps | 178/18 |
| 3,436,476 | 4/1969 | Bixby | 178/18 |
| 3,439,317 | 4/1969 | Miller et al. | 340/1 |
| 3,528,295 | 9/1970 | Johnson et al. | 73/432 |

FOREIGN PATENTS

| | | | |
|---|---|---|---|
| 1,088 | 4/1865 | England | 178/18 |

*Primary Examiner*—Richard A. Farley
*Assistant Examiner*—N. Moskowitz
*Attorney*—Frank R. Trifari

ABSTRACT: A writing stylus for use as a graphical-input terminal for digital computers. The stylus will produce a fast rise time shock energy sound wave generated by a spark detectable by coordinately placed microphones, at the instant the spark is produced can be determined and recorded in digital form.

Figure 1:
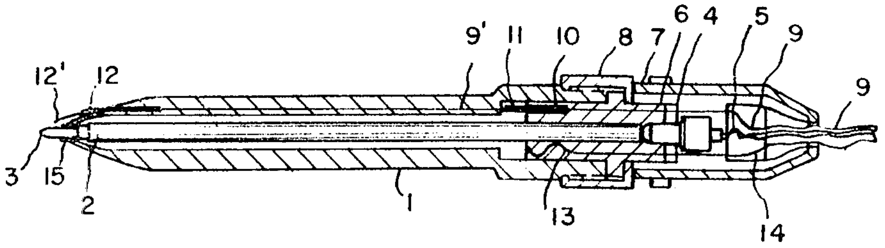

*INVENTORS.*
ALBERT WHETSTONE
STANLEY PHILLIPS
WILLIAM BANKS
SAMUEL FINE.
BY Frank R. [signature] AGENT

SPARK PEN

This invention relates to a system of man-machine interface with computers, and more specifically to a graphical input method for digital computers wherein a writing stylus or pen is used. The pen of this system when moved over a writing tablet not only produces a written image but will also generate a continuous series of fast rise time shock energy sound waves generated by electrical sparks which can be detected by microphones placed near the tablet. The microphones in turn are coupled to a data digitizer which senses the time duration between each spark generation and thus can record the instantaneous position of the pen in digital form in the computer, or display same on a cathode Ray tube.

One of the present methods of interaction with computers for graphical input consists of the use of a writing tablet which has a network of pressure-sensitive wires running therethrough such that when the writing stylus coacts with such wires the position or location of the stylus can be tracked and recorded. This system is rather expensive to manufacture and its applications are limited as compared to the present invention. Another system utilizes the so-called light pen in which a light is generated from the stylus and is used to trace the movement of the stylus and record the same in digital form for the computer; or conversely a photosensor in the stylus can be used to sense light on a screen and the time at which the light is sensed tells the computer the location of the stylus.

Since the spark pen can be used with a cathode ray tube display it is superior to the light pen because it will permit interaction with storage scope displays and thus further lower the burden on the computer. Additionally, it is capable of interacting with dark portions of the display as well as bright sections and it is inherently more accurate than the light pen. Besides interacting with a storage cathode ray tube display, the spark pen can be used with a writing tablet to create drawings or to trace over existing drawings, and it is even possible to digitize three dimensional graphic information by an expansion of the two dimensional microphone receiving system.

This application relates to the stylus or spark pen used in conjunction with a graphical interactive system for producing an input signal, applications to the entire system are being separately filed.

The spark pen has a basic structure similar to a conventional ball-point writing pen. The outer housing or main body has been increased in diameter to provide space for the additional components and to facilitate the ease for mechanical assembly and disassembly. At the writing end of the pen a spark gap has been formed and is shielded with a barium titanate collar to control the direction of the spark and the resultant shock energy sound waves so that same may be received by microphones placed along an imaginary X and Y axis. When the pen is pressed against the writing paper, of a microphone equipped tablet, the ink reservoir is moved rearwardly to activate a microswitch located in the rear of the main body which energizes the digitizing circuit for converting the signals received by the microphones along the X and Y axis into sets of numbers, thusly the locus of the inked images on the paper are simultaneously stored as electrical impulses within the computer. When the pen is lifted off the paper although the sparks will continue, the microswitch deactivates the digitizing circuit. It should be noted that the circuitry for digitizing can be activated by an external switch. Furthermore, in place of the ink cartridge, a conductive rod having a ball or other smooth comparatively frictionless point, could be used.

An object of this invention is to provide a writing stylus capable of producing a fast rise time shock energy sound wave which can be received and recorded by coordinately spaced microphones and digitized for use in a computer system.

Another object of this invention is to provide a spark pen having means for reducing spark erraticity, wandering, and nonfiring and to control the location and direction of the sparks.

Still another object of this invention is to provide within a spark pen a microswitch assembly for automatically energizing the digitizing circuit when the pen is pressed against the writing tablet.

A further object of this invention is to provide a spark pen having a construction which will facilitate the assembly or disassembly thereof.

The above and other objects, features, and advantages of the present invention will be apparent in the following description of the preferred embodiments when considered in conjunction with the accompanying drawings wherein:

FIG. 1 shows a cross-sectional view of the spark pen.

Figure 2:
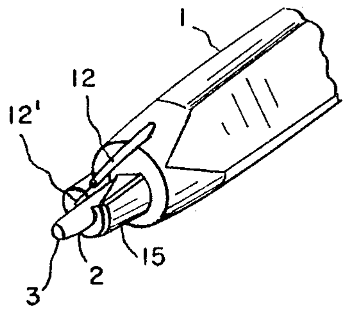

FIG. 2 shown an isometric view of the pen.

The figures illustrate one preferred embodiment of the invention wherein the spark pen construction is comprised of an elongated tubular-shaped housing 1, which contains an ink cartridge 2, having a ball point 3 for writing. The ink cartridge which has a conductive outercasing is mounted within an epoxy connector member 6, which holds the cartridge in the desired orientation and also serves as a connecting member for joining the various electrical and mechanical components of the spark pen. The microswtich 4, is mounted within the connector 6, immediately adjacent the rear of the ink cartridge 2, such that when the ball point is pressed against the paper for writing, the pressure on the paper will move the ink cartridge towards the microswitch 4, a sufficient amount to activate the switch 4. The switch is connected via wires 5 to a circuit for digitizing the shock waves received by the coordinately placed microphones and is the subject matter of another application. It should be evident that when the pen is lifted off the paper and the point is not in contact with the paper, the microswitch will be deactivated and the digitizing circuit will be deenergized. In another embodiment, the activation of the digitizing circuit is achieved by means of a switch which is external of the spark pen and controlled by manual operation.

The high-voltage wire 9 is introduced into the housing through a boot member 7 which is attached to the connector 6. The high-voltage wire 9, runs along a drilled-out passage through the connector 6 and terminates in a high-voltage receptacle member 10, located at one end of the connector 6. When the boot 7, is attached to the housing 1 by means of collar 8, a mating plug 11 conductively engages the receptacle 10 and the high-voltage is carried along conductive wire 9' which runs through a drilled-out passage in housing 1 to a section of brass tubing 12 extending from the drilled-out passageway and projecting outwardly from the housing. A tungsten whisker 12' is affixed within on the brass tubing by means of an electrically conductive epoxy adhesive and is conductively joined to the wire 9' at one end; the opposite end of the whisker is spaced from the wall of the ink cartridge to form a spark gap.

Immediately surrounding the ink cartridge in the area of the writing point 3 is a cylindrical collar 15 attached to the housing. The collar may have, as shown in FIG. 2, an open notch in its cylindrical surface positioned opposite the end of the whisker 12'. The purpose of this collar is to direct the spark which is transmitted from the whisker to the conductive casing of the ink cartridge. The use of barium titanate for the collar material has been found to be particularly advantageous because this material will cause the spark to fire in the same direction each time the voltage pulse arrives at the end of the whisker, and will reduce spark erraticity and consequently will reduce the amount of energy required to fire the spark. An open notch is not essential, however, when it is used, it is useful to direct the shock wave to the microphones since the spark generated will run along the notch and thereby provide a clear path for the wave to travel to the coordinately placed microphones. By shaping the walls of the housing, a finger grip can be provided so that the operator will hold the pen in the operatively correct position and the notch will properly be aligned with the microphones.

By way of example, the brass tubing can be 0.062 inches. O.D. and the tungsten whisker can be 0.006 inches in diameter, the barium titanate collar can be 0.152 inches in diameter and 0.178 inches in length the notch may be V-shaped with the open end of the V corresponding to the free edge of the collar and being 0.031 inches; the dimension of the depth of the V can also be 0.031 inches. It should be understood of course that these measures and dimensions are given by way of example only and that other dimensions and notch shapes, may work equally as well.

A ground return wire 14 for the high-voltage conductively contacts the wall of the ink cartridges by means of a resilient sliding contact 13, which may for example be made of 0.020 inches diameter piano wire. The sliding contact is so positioned in the connector 6 that it will contact the wall of the ink cartridge and thereby serve as a ground return wire for the high-voltage passing through the wall of the ink cartridge.

In operation the pen is picked up by the user and held in the usual writing manner. The high-voltage passing through the spark gap will produce a continuous series of shock energy sound waves. When the pen point is pressed against a sheet of paper, not only will the written image appear on the paper but the pressure on the ink cartridge will also activate a digitizing circuit such that the shock wave emanating from the spark, will be received by the coordinately spaced microphones which are coupled to a data digitizer and will track the movement of the pen and record same in digitized form or display same on a cathode ray tube.

The above cited embodiments are intended as exemplary and while they are described the invention with a specific implementation and embodiment other modifications thereof will be apparent to those skilled in the art.

What is claimed is:

1. A stylus for use with a graphical input computer system comprising a tubular housing, a high-voltage carrying conductor positioned within said housing, an additional conductive member mounted within said housing and extending therefrom so that between the first end of said high-voltage carrying conductor and said additional conductive member a spark gap is formed for a spark generated shock energy sound wave, a cylindrical collar member surrounding the conductive member for controlling the sparks, and switch means within the housing for energizing a digitizing circuit when the stylus is operative.

2. A stylus as claimed in claim 1 wherein the switch means comprises a microswitch mounted adjacent the conductive member and activated by said conductive member.

3. A stylus as claimed in claim 2 further comprising a resilient ground return member in sliding contact with the conductive member.

4. A stylus as claimed in claim 3 wherein the conductive member comprises a ball-point ink cartridge having a conductive outer casing.

5. A stylus as claimed in claim 4 wherein the cylindrical collar member is made of barium titanate.

6. A stylus as claimed in claim 5 further comprising a conducting tube projecting outwardly from the housing for containing said high-voltage carrying conductor and placing the first end of same adjacent said ink cartridge to form the spark gap.

7. A stylus as claimed in claim 6 wherein the high-voltage carrying conductor within the conducting tube and adjacent said ink cartridge comprises a tungsten whisker.

8. A stylus as claimed in claim 7 further comprising a connector member within said housing for positioning the internal components.

9. A stylus as claimed in claim 7 wherein said conducting tube is made of brass.

10. A stylus as claimed in claim 8 further comprising a "V" notch formed in said cylindrical collar member, said notch being located opposite from the first end of the high-voltage carrying conductor.

* * * * *

PO-1050
(5/69)

UNITED STATES PATENT OFFICE
CERTIFICATE OF CORRECTION

Patent No. 3,626,483 Dated December 7, 1971

Inventor(s) ALBERT WHETSTONE ET AL

It is certified that error appears in the above-identified patent and that said Letters Patent are hereby corrected as shown below:

In the Abstract, line 4, after "microphones," insert --such that the spacial location of the stylus with respect to the mircrophones--;

Col. 1, line 13, "Ray" should be --ray--.

Signed and sealed this 19th day of September 1972.

(SEAL)
Attest:

EDWARD M.FLETCHER,JR.
Attesting Officer

ROBERT GOTTSCHALK
Commissioner of Patents